Patented Nov. 13, 1928.

1,691,543

UNITED STATES PATENT OFFICE.

CARROLL ALBERT CRAWFORD, OF BERWYN, ILLINOIS, ASSIGNOR TO WESTERN ELECTRIC COMPANY, INCORPORATED, OF NEW YORK, N. Y., A CORPORATION OF NEW YORK.

COMBINED WATERPROOF AND ADHESIVE COMPOSITION.

No Drawing.     Application filed September 12, 1922. Serial No. 587,845.

This invention relates to improvements in combined waterproofing and adhesive compositions.

An object of the invention is to produce a waterproof and adhesive composition which has a high melting point, when molten is very fluid, and in cooling solidifies rapidly.

A further object is to provide a composition which in addition to having the characteristics above mentioned, is also hard and tough when in its solid state.

A waterproofing and adhesive composition made in accordance with the present invention comprises resin, wax, and an oxidizing oil.

A suitable illustrative composition may be made by melting together at a temperature not over 392° Fahrenheit 50 parts by weight, paracumarone resin, and 40 parts by weight carnauba wax. 20 parts by weight raw linseed oil is then stirred in and the mixture held between 350° and 400° Fahrenheit for approximately forty-five minutes while being continuously agitated.

Another suitable illustrative composition may comprise 50 parts by weight paracumarone resin, 40 parts by weight carnauba wax, and 20 parts by weight China-wood oil, the mixture being made in the same manner as described above.

The combined waterproof and adhesive composition made in accordance with this invention may be used to advantage in the manufacture of coils used in the receivers of telephonic apparatus. When used for this purpose the compound is melted and maintained between 212° and 230° Fahrenheit. The coils to be treated are baked twenty minutes at between 212° and 230° Fahrenheit and then introduced without cooling into the melted compound. The coils are held in the compound for thirty minutes under vacuum, the temperature of the compound being kept between 212° and 230° Fahrenheit. The vacuum is then released and the compound drawn off. The coils are allowed to drain in the impregnating pot for fifteen minutes, the temperature being held at 212° Fahrenheit. The coils are then removed from the impregnating tank and the excess compound removed by wiping with a cloth. The coils are then cooled to room temperature.

Coils to be treated with this compound are formed from wire wrapped with cotton, silk, or other suitable insulating material, the compound being sufficiently fluid to thoroughly impregnate the convolutions of the coil, rendering it impervious to moisture. The compound in cooling solidifies rapidly and has sufficient adhesive characteristics to hold the convolutions of the coil in place, so that the coil may be used without retaining means such as spool heads and the like. The compound is also sufficiently hard and tough to resist abrasion or the dislodgment of the convolutions of the coil when the coil is being handled during its assembly in the receiver.

A waterproof and adhesive composition made in accordance with the present invention has a high melting point and for this reason may be used where the article treated is subject to relatively high temperatures. Due to its high melting point the composition may be used to advantage in the treatment of electrical coils or other apparatus which in use may become heated due to the internal resistance of the coil or apparatus.

Although the compound is particularly adapted for treating receiver coils, it is to be understood that it is not confined to this use and that the invention is to be limited only by the spirit and scope of the appended claims.

What is claimed is:

1. A combined waterproof and adhesive composition consisting of paracumarone resin, carnauba wax, and raw linseed oil.

2. A combined waterproof and adhesive composition consisting of approximately 50 parts by weight paracumarone resin, approximately 40 parts by weight carnauba wax, and approximately 20 parts by weight raw linseed oil.

3. A method of preparing a combined waterproof and adhesive composition which consists in mixing approximately 50 parts by weight paracumarone resin and approximately 40 parts by weight carnauba wax, melting the mixture at approximately 390° Fahrenheit, then stirring in approximately 20 parts by weight of raw linseed oil, the temperature of the mixture being held between approximately 350° and 400° Fahrenheit for about 45 minutes, while being continuously agitated.

4. A method of preparing a combined waterproof and adhesive composition which consists in mixing paracumarone resin and carnauba wax, melting the mixture, adding raw linseed oil thereto, and heating the resultant mixture at a temperature between approximately 350° and 400° Fahrenheit.

5. A method of preparing a combined waterproof and adhesive composition which consists in mixing paracumarone resin and carnauba wax, melting the mixture, adding raw linseed oil thereto, and heating the resultant mixture at a temperature between approximately 350° and 400° Fahrenheit, for 45 minutes while being continuously agitated.

6. A method of preparing a combined waterproof and adhesive composition which consists in mixing paracumarone resin and carnauba wax, melting the mixture at approximately 390° Fahrenheit, and then stirring in a small percentage of raw linseed oil, the temperature of the mixture being held between approximately 350° and 400° Fahrenheit for 45 minutes.

In witness whereof, I hereunto subscribe my name this 29th day of August A. D., 1922.

CARROLL ALBERT CRAWFORD.